United States Patent [19]

Yamada et al.

[11] Patent Number: 5,081,189

[45] Date of Patent: Jan. 14, 1992

[54] PROPYLENE-ETHYLENE COPOLYMER COMPOSITION AND PROCESS FOR PRODUCING THE SAME

[75] Inventors: Takayuki Yamada, Osaka; Takashi Kanbayashi, Kanagawa; Shigeru Kimura; Takeo Inoue, both of Osaka, all of Japan

[73] Assignee: Mitsui Toatsu Chemicals, Inc., Tokyo, Japan

[21] Appl. No.: 408,488

[22] PCT Filed: Nov. 15, 1988

[86] PCT No.: PCT/JP88/01155

§ 371 Date: Aug. 11, 1989

§ 102(e) Date: Aug. 11, 1989

[87] PCT Pub. No.: WO90/05764

PCT Pub. Date: May 31, 1990

[30] Foreign Application Priority Data

May 11, 1987 [JP] Japan .................. 62-112501

[51] Int. Cl.$^5$ .............................................. C08L 23/16
[52] U.S. Cl. ........................... 525/240; 525/322; 525/323
[58] Field of Search ................... 525/240, 322

[56] References Cited

U.S. PATENT DOCUMENTS

| | | | |
|---|---|---|---|
| 3,200,173 | 8/1965 | Schilling | 525/240 |
| 3,562,790 | 2/1971 | Coover et al. | 525/240 |
| 3,629,368 | 12/1971 | Fukuda et al. | 260/878 B |
| 4,128,606 | 12/1978 | Furutachi et al. | 280/878 |
| 4,473,687 | 9/1984 | Dorrer et al. | 525/240 |
| 4,487,871 | 12/1984 | Ishibashi et al. | 525/240 |
| 4,521,566 | 6/1985 | Galli et al. | 525/240 |
| 4,547,552 | 10/1985 | Toyata et al. | 525/322 |
| 4,820,775 | 4/1989 | Shiga et al. | 525/323 |
| 4,882,380 | 11/1989 | Ficker et al. | 525/53 |

FOREIGN PATENT DOCUMENTS

| | | |
|---|---|---|
| 1199746 | 1/1986 | Canada . |
| 74030264 | 8/1974 | Japan . |
| 53-079939 | 7/1978 | Japan . |
| 58-157839 | 9/1983 | Japan . |
| 60-152543 | 8/1985 | Japan . |
| 61-192752 | 8/1986 | Japan . |

*Primary Examiner*—Carman J. Seccuro
*Attorney, Agent, or Firm*—Baker & Daniels

[57] ABSTRACT

Provided herein is a propylene-ethylene copolymer composition which comprises (a) 10 to 25 parts by weight of a first propylene-ethylene copolymer containing 90 wt % or more of ethylene and (b) 75 to 90 parts by weight of a second propylene-ethylene copolymer containing 0.5 to 2.5 wt % of ethylene, the first copolymer having intrinsic viscosity of $\eta_a$ and the second copolymer having an intrinsic viscosity of $\eta_b$, said intrinsic viscosities being defined by $\eta_a - \eta_b = -0.2$ to $+1.2$ dl/g.

2 Claims, No Drawings

PROPYLENE-ETHYLENE COPOLYMER COMPOSITION AND PROCESS FOR PRODUCING THE SAME

BACKGROUND OF THE INVENTION

The present invention relates to a propylene-ethylene copolymer composition and a process for producing the same. More particularly, it is concerned with a propylene-ethylene copolymer composition suitable for use as film for insulating oil-impregnated capacitors and also to a process for producing said composition.

Recent years have been the wide spread use of biaxially-stretched laminated film composed mainly of polypropylene (PP for short) and having a roughened surface on at least one side thereof, into the fields of electric, packaging, and printing industries.

Among the applications of film with a roughened surface is film for insulating oil-impregnated capacitors. According to a recently proposed process, it is produced, for example, by the steps of forming, by melt processing, a PP sheet with the β-type crystalline structure from a raw material incorporated with a specific nucleating agent, and stretching the PP sheet, thereby roughening the film surface.

In the fields of packaging and printing, there has been proposed a new process for producing film with a roughened surface by biaxially stretching a laminate film having, on at least one side thereof, a layer of propylene-ethylene copolymer composition. This process efficiently provides a film with a high haze value (ASTM D-1003), which is a measure to indicate the degree of surface roughness of film and with easiness of processing.

PP films with a roughened surface should meet the following requirements, if they are to be used as a film for insulating oil-impregnated capacitors.
(1) They should have a high breakdown voltage.
(2) They should permit the insulating oil to infiltrate easily into the space between the dielectric material and the electrode surface. In other words, they should have a high haze value.
(3) They should have high oil resistance for the insulating oil.

Unfortunately, films obtained from the sheet with the β-type crystalline structure do not meet these requirements, because they lack fine and uniform surface roughness, so that they do not have the desired surface roughness and also do not permit the rapid infiltration of insulating oil.

By contrast, the biaxially stretched laminate film with a rough surface of propylene-ethylene copolymer layer, which is conventionally used in the fields of packaging and printing, has a high haze value and hence permits the rapid infiltration of insulating oil. However, such a laminate film is poor in oil resistance (or it contains a large amount of fraction which is extracted by insulating oil), because it has a low isotactic index (II for short), which is expressed in term of the residual amount remaining unextracted when extracted with boiling n-heptane for 10 hours. In addition, the tan δ of insulating oil (measured according to JIS C2320, 80° C./p-xylene, 2 hr) and also the viscosity of insulating oil are increased, adversely affecting the performance of capacitors.

SUMMARY OF THE INVENTION

In order to solve the above-mentioned problems, the present inventors have diligently studied the production of a new film for insulating oil-impregnated capacitors from a propylene-ethylene copolymer composition, said film having a good oil resistance and an adequate degree of surface roughness. The results of their studies have led to the present invention.

DETAILED DESCRIPTION OF THE INVENTION

Disclosed herein is a propylene-ethylene copolymer composition which comprises (a) 10 to 25 parts by weight of a first propylene-ethylene copolymer containing 90 wt % or more of ethylene and (b) 75 to 90 parts by weight of a second propylene-ethylene copolymer containing 0.5 to 2.5 wt % of ethylene, the first copolymer having an intrinsic viscosity of $\eta_a$ and the second copolymer having an intrinsic viscosity of $\eta_b$, said intrinsic viscosities being defined by $\eta_a - \eta_b = -0.2$ to $+1.2$ dl/g.

According to the process of the present invention, propylene and ethylene are copolymerized to give a first propylene-ethylene copolymer (a) containing 90 wt % or more of ethylene by using a stereoregular catalyst so that the copolymer (a) accounts for 10 to 25 parts by weight in the final copolymer composition, and then, propylene and ethylene are copolymerized to give a second propylene-ethylene copolymer (b) containing 0.5 to 2.5 wt % of ethylene so that the copolymer (b) accounts for 75 to 90 parts by weight in the final copolymer composition, the copolymerization being accomplished in such a manner that the first copolymer has an intrinsic viscosity of $\eta_a$ and the second copolymer has an intrinsic viscosity of $\eta_b$, said intrinsic viscosities being defined by $\eta_a - \eta_b = -0.2$ to $+1.2$ dl/g.

The composition of the present invention can be produced in many ways.

According to the first process, the first propylene-ethylene copolymer (a) containing 90 wt % or more of ethylene and the second propylene-ethylene copolymer (b) containing 0.5 to 2.5 wt % of ethylene are produced separately in such a manner that the first copolymer has an intrinsic viscosity of $\eta_a$ and the second copolymer has an intrinsic viscosity of $\eta_b$, said intrinsic viscosities being defined by a $\eta_a - \eta_b - 0.2$ to $+1.2$ dl/g, and finally the two copolymers are mixed with each other.

According to the second process, propylene and ethylene are copolymerized to give the first propylene-ethylene copolymer (a) containing 90 wt % or more of ethylene and then, propylene and ethylene are copolymerized to give the second propylene-ethylene copolymer (b) containing 0.5 to 2.5 wt % of ethylene in the same polymerization system, the copolymerization being accomplished in such a manner that the first copolymer has an intrinsic viscosity of $\eta_a$ and the second copolymer has an intrinsic viscosity of $\eta_b$, said intrinsic viscosities being defined by $\eta_a - \eta_b = -0.2$ to $+1.2$ dl/g.

According to the third process, propylene and ethylene are copolymerized to give the second propylene-ethylene copolymer (b) containing 0.5 to 2.5 wt % of ethylene and then, propylene and ethylene are copolymerized to give the first propylene-ethylene copolymer (a) containing 90 wt % or more of ethylene in the same polymerization system, the copolymerization being accomplished in such a manner that the first copolymer has an intrinsic viscosity of $\eta_a$ and the second copolymer has an intrinsic viscosity of $\eta_b$, said intrinsic viscosities being defined by $\eta_a - \eta_b = -0.2$ to $+1.2$ dl/g.

The stereoregular catalyst used to produce the composition of the present invention is not specifically limited; it includes any catalyst that is used for the production of stereoregular propylene polymer. An example of such catalysts is composed of a transition metal catalyst and an organoaluminum compound. A preferred catalyst is composed of a titanium halide as the transition metal catalyst and an organoaluminum compound. The titanium halide is, for example, titanium trichloride which is prepared by reducing titanium tetrachloride with metallic aluminum, hydrogen, or organoaluminum. The titanium halide may be supported on a magnesium halide.

In the case where the propylene-ethylene copolymer composition of the present invention is produced in the same polymerization system, the copolymerization may be accomplished, for example, by solvent polymerization which employs an inert hydrocarbon as the solvent, or by bulk polymerization which employs liquid propylene per se as the solvent. In the first step, copolymerization is performed by using the abovementioned stereoregular catalyst on a mixed gas of propylene and ethylene to give the first copolymer (a) in such a manner that the first copolymer accounts for 10 to 25 parts by weight in the final copolymer composition. The mixed gas is prepared such that the resulting copolymer contains 90 wt % or more of ethylene. In the next step, copolymerization is performed on a mixed gas of propylene and ethylene to give the second copolymer (b) in such a manner that the second copolymer accounts for 75 to 90 parts by weight in the final copolymer composition. The mixed gas is prepared such that the resulting copolymer contains 0.5 to 2.5 wt % of ethylene. In this way there is obtained the desired copolymer composition in which the copolymer (a) and the copolymer (b) are joined to each other.

The copolymerization is accomplished by adding a proper amount of a molecular weight modifier (e.g., hydrogen) so that the copolymer (a) and the copolymer (b) each have the desired molecular weight. The molecular weight is expressed in terms of intrinsic viscosity (dl/g) measured on a tetralin solution (0.1 g/100 ml) at 135° C. The molecular weight should be controlled so that the two copolymers have the intrinsic viscosities of $\eta_a$ and $\eta_b$, which are defined by $\eta_a - \eta_b = -0.2$ to $+1.2$ dl/g. (The difference of $\eta_a$ and $\eta_b$ will be indicated by $\Delta\eta$ hereinafter.)

The composition of the present invention may also be produced by mixing separately produced copolymer with each other instead of performing the above-mentioned copolymerization steps one after the other in the same system. In this case, the mixing should be performed such that the ratio of copolymer (a) to copolymer (b) is 10–25 parts by weight to 75–90 parts by weight.

Needless to say, the propylene-ethylene copolymer composition of the present invention may be mixed with any known stabilizers, antioxidants, hydrochloric acid scavenger, and other additives which are commonly used for polypropylene.

The copolymer composition of the present invention is generally formed into film for insulating oil-impregnated capacitors by stretching the coextruded sheet. The coextrusion is accomplished such that the resulting laminate sheet is composed of at least one layer of the copolymer composition and one layer of capacitor-grade PP in the ratio of from 1/20 to $\frac{1}{4}$ by weight.

According to the present invention, the first copolymer (a) is a propylene-ethylene copolymer containing 90 wt % or more, preferably 95 wt % or more, and more preferably 99 wt % or more of ethylene, or an ethylene homopolymer. It should accounts for 10 to 25 parts by weight, preferably 14 to 20 parts by weight, in the total amount (100 parts by weight) of the propylene-ethylene copolymer composition.

With an ethylene content lower than 90 wt %, the copolymer has a low II and hence is poor in oil resistance and tan δ. With the content of the copolymer (a) less than 10 parts by weight, the copolymer composition does not provide the roughened surface as desired. Conversely, with the content of the copolymer (a) exceeding 25 parts by weight, the copolymer composition is liable to cause fish-eyes (FE for short), and has an extremely roughened surface. Fish-eyes mean small globular masses having a diameter greater than 200 μm. The quality of 40-μm thick cast film is evaluated in terms of the number of fish-eyes in an area of 600 cm² of the cast film.

The copolymer (b) constituting the copolymer composition of the present invention is a propylene-ethylene copolymer containing 0.5 to 2.5 wt %, preferably 1.0 to 2.0 wt %, more preferably 1.2 to 1.7 wt % of ethylene. It should accounts for 75 to 90 parts by weight, preferably 80 to 86 parts by weight in the copolymer composition.

If the copolymer (b) contains less than 0.5 wt % of ethylene, the resulting propylene-ethylene copolymer composition does not provide films with rough surface as desired when it is laminated onto at least one side of a substrate sheet and then, the resulting laminate sheet is subjected to biaxial stretching. Such a laminated film does not permit sufficient impregnation with insulating oil when used as a dielectric material of insulating oil-impregnated capacitors. If the copolymer (b) contains more than 2.5 wt % of ethylene, the resulting laminate film permits sufficient impregnation with insulating oil, but the rough surface layer lacks oil resistance, which leads to an increase in tan δ.

With the content of the copolymer (b) exceeding 90 parts by weight, the propylene-ethylene copolymer composition does not provide films of rough surface as desired. Conversely, with the content of the copolymer (b) less than 75 parts by weight, the propylene-ethylene copolymer composition is liable to cause fish-eyes and to provide an extremely roughened surface.

What is important in the present invention is that the copolymers (a) and (b) should have intrinsic viscosities of $\eta_a$ and $\eta_b$ whose difference $\Delta\eta$ is in the range of $-0.2$ to $+1.2$ dl/g, preferably $+0.2$ to $+0.8$ dl/g. With a $\Delta\eta$ smaller than $-0.2$, the copolymer composition does not provide the desired rough surface and is poor in the performance of insulating oil impregnation. Conversely, with a $\Delta\eta$ exceeding $+1.2$, the copolymer composition provides an extremely roughened surface fish-eyes resulting from the copolymer (a).

The intrinsic viscosities of the two copolymers are properly controlled so that the resulting copolymer composition has a melt index (MI for short) in the range of 1.0 to 7.0 g/10 min, preferably 3.0 to 5.0 g/10 min, measured according to ASTM D-1238, 230° C., 2.16 kg.

With an MI lower than 1.0 g/10 min, the copolymer composition has such a high molecular weight that it is not readily processed into film. Conversely, with an MI higher than 7.0 g/10 min, the copolymer composition provides a film with insufficient surface roughness, yet with many fish-eyes.

EXAMPLES

The invention will be described in more detail with reference to the following examples.

The copolymer composition of the present invention should have the physical properties in the range specified below.

II: 90% or above
FE: less than 50 per 600 cm$^2$
Haze: 35 to 70%
tan δ: lower than 0.05%

EXAMPLE 1

A 200-liter SUS-27 autoclave was charged under nitrogen with 100 liters of heptane and 50 g of activated titanium trichloride (as a catalyst) and 80 g of diethyl aluminum chloride. The autoclave was further charged with a propylene-ethylene mixed gas (containing 99.5 wt % of ethylene) and hydrogen so that when the autoclave is heated to 55° C. (internal temperature), the internal pressure of the autoclave reached 7 kg/cm$^2$.G (gauge pressure) and the concentration of hydrogen in the gas phase reached 65 vol %. The autoclave was continuously charged with the propylene-ethylene mixed gas and hydrogen while keeping the internal temperature of the autoclave at 55° C., the internal pressure of the autoclave at 7 kg/cm$^2$.G, and the concentration of hydrogen at 65 vol %. Polymerization was continued for 2.0 hours. This is the first polymerization operation to form the copolymer (a).

The autoclave was completely purged of unreacted monomers, while the catalyst was kept active. The autoclave was charged again with a propylene-ethylene mixed gas (containing 1.5 wt % of ethylene) and hydrogen so that the internal pressure of the autoclave reached 2.5 kg/cm$^2$.G and the concentration of hydrogen in the gas phase reached 4.2 vol %. The internal temperature of the autoclave was raised to 55° C. to start polymerization. The autoclave was continuously charged with the propylene-ethylene mixed gas and hydrogen while keeping the internal pressure of the autoclave at 2.5 kg/cm$^2$.G and the concentration of hydrogen at 4.2 vol %. Polymerization was continued for 5.0 hours. This is the second polymerization operation to form the copolymer (b).

The autoclave was charged with 20 liters of methanol to terminate polymerization. Upon purification and drying in the usual way, there was obtained 39 kg of polymer in powder form.

The thus obtained polymer was found to contain the copolymer (a) and the copolymer (b) in the ratio of 17:83 by weight according to the material balance calculated from the partial pressure of the monomers in each stage. The ethylene content in the copolymers (a) and (b) was 99.5 wt % and 1.5 wt %, respectively.

When the first polymerization operation was over, a very small amount of polymer slurry was extracted from the autoclave through the lower side tube. The polymer slurry was placed in a large excess of methanol to precipitate solids. The solids were filtered and dried. Thus there was obtained a powdery polymer which is the copolymer (a). The intrinsic viscosity $\eta_a$ of the copolymer (a) was measured. When the second polymerization was over, the above-mentioned procedure was repeated to measure the intrinsic viscosity $\eta_{ab}$ of the copolymer composition. $\eta_a$ was 2.25 dl/g and $\eta_{ab}$ was 1.84 dl/g. The intrinsic viscosity $\eta_b$ of the copolymer (b) was calculated as follows:

$$\eta_b = \frac{\eta_{ab} - \eta_a \times (\text{ratio of copolymer }(a)\text{ by weight})}{\text{ratio of copolymer }(b)\text{ by weight}}$$

$$= \frac{1.84 - 2.25 \times 0.17}{0.83} = 1.75 \text{ dl/g}$$

Thus, $\Delta\eta = \eta_a - \eta_b = 2.25 - 1.75 = 0.5$

The polymer powder obtained after the completion of the second polymerization operation was found to contain 18.2 wt % of ethylene (measured by infrared absorption spectrometry).

For the measurement of isotactic index (II), the powdery polymer obtained in the above-mentioned step was extracted with boiling n-heptane for 10 hours. The II is expressed in terms of percentage of the residues remaining undissolved (on dry basis).

The thus obtained powdery polymer was mixed with 0.15 wt % of 2,6-di-t-butyl-p-cresol, 0.05 wt % of antioxidant ("Irganox" made by Ciba-Geigy Corp.), and 0.05 wt % of calcium stearate. The mixture was pelletized after uniform mixing. The pellets were found to have a melt index of 4.0 g/10 min.

The pellets in combination with PP were made into a 600-μm thick sheet for biaxial stretching by two-layer coextrusion. For the first layer, the pellets were fed to an extruder with 20 mmφ diameter, and for the second layer, capacitor-grade PP having an MI of 1.5 g/10 min ("Noblen F0-100" made by Mitsui Toatsu Chemicals, Inc.) was fed to an extruder with 20 mmφ diameter. The extrudates were combined in a lamination die so that the ratio of the thickness of the first layer to the thickness of the second layer was 1:9.

The thus obtained laminate sheet was stretched in two directions sequentially by using a batch-type biaxial stretching machine at 155° C. The draw ratio in the machine direction was 5 and the draw ratio in the transverse direction was 7. Thus there was obtained a film for insulating oil-impregnated capacitors.

This film was found to have a haze value of 50% (according to ASTM D-1003) and have a roughened surface as desired and a good tan δ. The results are shown in Table 1.

EXAMPLES 2 and 3

The same procedure as in Example 1 was repeated except that the ethylene content in the copolymer (b) was changed to 0.7 wt % or 2.2 wt %. The polymerization conditions and the physical properties of the film are shown in Table 1.

COMPARATIVE EXAMPLES 1 and 2

The same procedure as in Example 1 was repeated except that the ethylene content in the copolymer (b) was changed to 3.0 wt % or 0.2 wt %. Physical properties of the copolymer composition and film obtained were measured. The II, tan δ, and haze were inferior. The film had not a roughened surface as desired. The results are shown in Table 1.

EXAMPLE 4

The same procedure as in Example 1 was repeated except that the ethylene content in the copolymer (a) was changed to 92 wt %. The physical properties of the film are shown in Table 1.

COMPARATIVE EXAMPLE 3

The same procedure as in Example 1 was repeated except that the ethylene content in the copolymer (a) was changed to 86 wt %. The physical properties of the film are shown in Table 1.

EXAMPLES 5 and 6

The same procedure as in Example 1 was repeated except that $\Delta\eta$ was changed to $+1.0$ or $-0.08$. The physical properties of the film are shown in Table 1.

COMPARATIVE EXAMPLES 4 and 5

The same procedure as in Example 1 was repeated except that $\Delta\eta$ was changed to $-0.7$ or $+1.5$. The physical properties of the film are shown in Table 1.

EXAMPLES 7 and 8

The same procedure as in Example 1 was repeated except that the amount of the copolymer (a) in the copolymer composition was changed to 11 parts by weight or 20 parts by weight. The physical properties of the film are shown in Table 1.

COMPARATIVE EXAMPLES 6 and 7

The same procedure as in Example 1 was repeated except that the amount of the copolymer (a) in the copolymer composition was changed to 30 parts by weight or 5 parts by weight. The physical properties of the film are shown in Table 1.

TABLE 1

| | Conditions of polymerization | | | | Physical properties | | | | |
|---|---|---|---|---|---|---|---|---|---|
| Example No. | Ethylene content in copolymer (a) (wt %) | Ratio of copolymer (a) in composition (parts by weight) | Ethylene content in copolymer (b) (wt %) | $\Delta\eta$ (dl/g) | Powder isotactic index (%) | Melt index 600 cm$^2$ | Fish-eyes per | Haze (%) | tan $\delta$ (%) |
| 1 | 99.5 | 17 | 1.5 | 0.5 | 94 | 4.0 | 20 | 50 | 0.019 |
| 2 | 99.5 | 17 | 0.7 | 0.5 | 97 | 3.9 | 20 | 39 | 0.014 |
| 3 | 99.5 | 15 | 2.2 | 0.5 | 92 | 3.8 | 30 | 64 | 0.021 |
| (1) | 99.5 | 17 | 3.0 | 0.6 | 85 | 4.1 | 20 | 65 | 0.201 |
| (2) | 99.6 | 17 | 0.2 | 0.5 | 98 | 3.9 | 30 | 17 | 0.019 |
| 4 | 92.0 | 17 | 1.5 | 0.4 | 90 | 3.7 | 30 | 40 | 0.028 |
| (3) | 86.0 | 18 | 1.5 | 0.5 | 87 | 4.0 | 10 | 45 | 0.185 |
| 5 | 97.8 | 18 | 1.5 | 1.0 | 91 | 3.5 | 50 | 57 | 0.025 |
| 6 | 100.0 | 18 | 1.4 | −0.08 | 95 | 3.1 | 20 | 40 | 0.009 |
| (4) | 96.0 | 17 | 1.6 | −0.7 | 91 | 3.0 | 10 | 18 | 0.020 |
| (5) | 99.5 | 17 | 1.5 | 1.5 | 95 | 3.2 | 200 | 65 | 0.018 |
| 7 | 100.0 | 11 | 1.5 | 0.6 | 93 | 4.0 | 10 | 41 | 0.020 |
| 8 | 99.5 | 20 | 1.3 | 0.4 | 96 | 4.0 | 50 | 69 | 0.010 |
| (6) | 99.5 | 30 | 1.5 | 0.5 | 92 | 3.1 | 110 | 78 | 0.018 |
| (7) | 99.5 | 5 | 1.5 | 0.5 | 91 | 4.3 | 20 | 24 | 0.020 |

Comparative Examples are indicated by parenthesized numbers.

What is claimed is:

1. A propylene-ethylene copolymer composition which comprises (a) 10 to 25 parts by weight of a first propylene-ethylene copolymer containing 90 wt % or more of ethylene and (b) 75 to 90 parts by weight of a second propylene-ethylene copolymer containing 0.5 to 2.5 wt % of ethylene, the first copolymer having an intrinsic viscosity of $\eta_a$ and the second copolymer having an intrinsic viscosity of $\eta_b$, said intrinsic viscosities being defined by $\eta_a-\eta_b=-0.2$ to $+1.2$ dl/g.

2. A process for producing a propylene-ethylene copolymer composition which comprises copolymerizing propylene and ethylene to give a first propylene-ethylene copolymer (a) containing 90 wt % or more of ethylene by using a stereoregular catalyst so that the copolymer (a) accounts for 10 to 25 parts by weight in the final copolymer composition, and then copolymerizing propylene and ethylene to give a second propylene-ethylene copolymer (b) containing 0.5 to 2.5 wt % of ethylene so that the copolymer (b) accounts for 75 to 90 parts by weight in the final copolymer composition, the first copolymer having an intrinsic viscosity of $\eta_a$ and the second copolymer having an intrinsic viscosity of $\eta_b$, said intrinsic viscosities being defined by $\eta_a-\eta_b=-0.2$ to $+1.2$ dl/g.

* * * * *